United States Patent

[11] 3,629,535

[72] Inventors William J. Walters
Wayne;
John G. Rusnack, Clifton, both of N.J.;
Peter P. D. Chen, Flushing, N.Y.
[21] Appl. No. 51,479
[22] Filed July 1, 1970
[45] Patented Dec. 21, 1971
[73] Assignee The Bendix Corporation

[54] ENVIRONMENTAL SEAL FOR AN ELECTRICAL SWITCH
13 Claims, 3 Drawing Figs.
[52] U.S. Cl. ................................................. 200/168 G
[51] Int. Cl. ................................................... H01h 9/04
[50] Field of Search ......................................... 200/168 G;
174/84 C

[56] References Cited
UNITED STATES PATENTS
3,456,227  7/1969  Paine et al. .................. 200/168 G X
3,144,539  8/1964  Morse .......................... 200/168 G
3,151,213  9/1964  Souter .......................... 174/84 C Primary Examiner—H. O. Jones
Attorneys—S. H. Hartz and Plante, Hartz, Smith and Thompson ABSTRACT: A switch has a body member and an actuating member mounted on the body member and movable relative thereto about mutually perpendicular axes. A sealing element in the form of a disc is mounted on one member and is fixed thereto and has a flexible portion urging a circumferential rolled band into engagement with a smooth surface on the other member to provide an environmental seal between the members.

PATENTED DEC 21 1971 3,629,535

INVENTORS
WILLIAM J. WALTERS
JOHN G. RUSNACK
PETER P. D. CHEN
BY
ATTORNEY

ENVIRONMENTAL SEAL FOR AN ELECTRICAL SWITCH

The invention relates to devices having relatively movable parts and more particularly to an environmental seal for such devices.

Electric switches as used heretofore were often sealed to avoid contamination from the atmosphere, but the seal precluded field maintenance. In many instances the switch had to be discarded rather than repaired when it became inoperative. Flexible diaphragms or bellows were used for sealing purposes, but the operating forces were excessive and the operating life was relatively short and did not meet modern requirements.

In order to overcome the difficulties of providing an environmental seal between two relatively movable members, the present invention contemplates a sealing element mounted on one member and fixed thereto and having a rolled band urged into engagement with a smooth surface on the other member to provide an environmental seal between the members. A thin layer of silicon grease may be applied between the rolled band of the sealing element and the smooth surface of the body to reduce friction and improve the seal.

One object of the present invention is to provide an environmental seal for a device having two relatively movable elements to prevent contaminants, such as dust, water, and excessive humidity, from contaminating the device.

Another object of the invention is to provide an environmental seal which can be readily disassembled and assembled to enable the device to be serviced in the field.

Another object of the invention is to provide an environmental seal having relatively low friction for a switch to enable the switch actuator to return to its original position substantially unrestricted when released.

Another object of the invention is to provide an environmental seal comprising a disclike sealing element which may be easily replaced in case of damage and which may be readily applied to devices in the field not already equipped with an environmental seal.

These and other objects and features of the invention are pointed out in the following description in terms of the embodiments thereof which are shown in the accompanying drawing. It is to be understood, however, that the drawing is for the purpose of illustration only and is not a definition of the limits of the invention, reference being had to the appended claims for this purpose.

Figure 1:
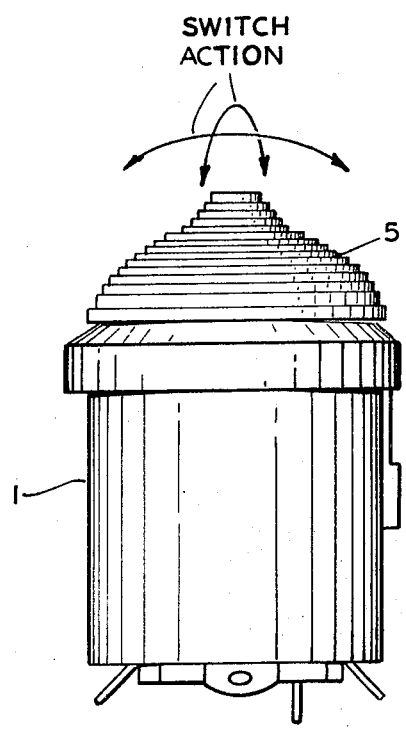
FIG. 1 is a side view of an electric switch having an environmental seal constructed according to the invention.

Referring to the drawing, an electric switch is shown therein having a novel environmental seal constructed according to the invention. The switch comprises a cylindrically shaped body 1 enclosing the switch contacts (not shown). A switch cartridge is mounted in the body and has an actuator 3 pivotally mounted within the body with one end movable laterally about two mutually perpendicular axes for selectively closing the switch contacts. An operator 5 is threaded on the actuator for manual operation of the switch.

The switch may be of the kind known as a four-way trim switch used on aircraft and having four equally spaced contacts which are engaged upon manual pivoting of actuator 3 about the two mutually perpendicular axes in the directions of the contacts. The actuator automatically returns to its original centered position when the operator 5 is released.

Figure 2:
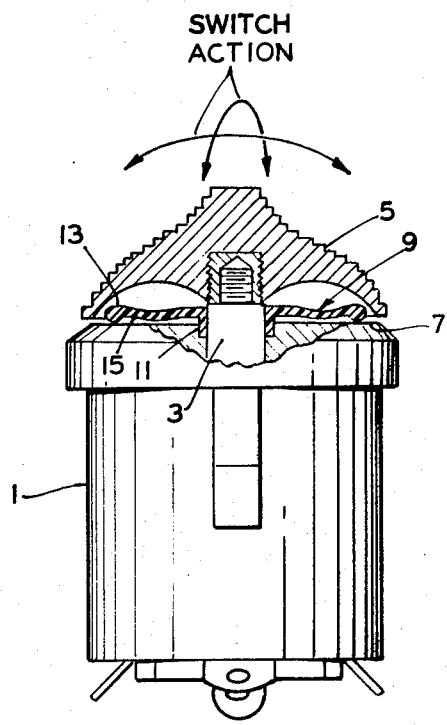
FIG. 2 is a side view at right angles to FIG. 1 showing the switch partly in section.

In FIG. 2 the switch is shown as provided with an environmental seal constructed according to one embodiment of the invention and including a disclike sealing element 9 preferably made of silicon rubber. Sealing element 9 has a hub 11 fitting snugly around and secured to actuator 3. Sealing element 9 also has a flexible portion 15 extending outwardly from hub 11 and terminating in a circumferential rolled band 13 which engages a planar smooth surface 7 on the top of body 1. Flexible portion 15 preferably is stressed to urge rolled band 13 lightly into engagement with the smooth surface of body 1. A thin layer of silicone grease may be applied between rolled band 13 on sealing element 9 and smooth surface 7 of body 1 to reduce friction.

The switch is operated by manually moving operator 5 to pivot actuator 3 in the direction of one of the contacts whereupon rolled band 13 of sealing element 9 slides on smooth surface 7 of body 1. The frictional force is small so that very small operating forces are required and when actuator 3 is released the switch returns to its original position substantially unrestricted as is usually required in switches of this kind.

Figure 3:
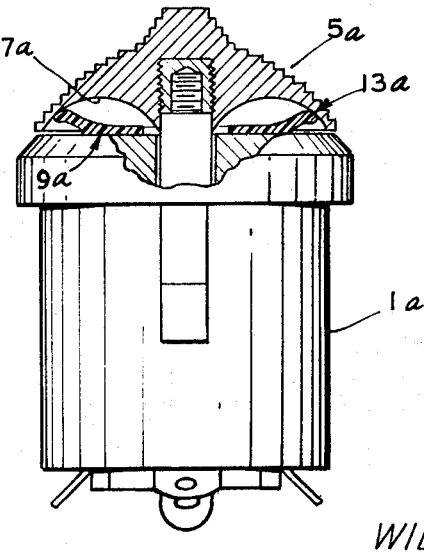
FIG. 3 is a view similar to FIG. 2 showing a second embodiment of the invention.

In FIG. 3 is shown a switch constructed in accordance with a second embodiment of the invention. In the arrangement shown, sealing element 9a is secured to the top of body 1a and rolled band 13a engages a curved smooth surface 7a on the lower face of operator 5a.

The sealing element actually is flexed very little and the silicone rubber is under very low stress so that the environmental seal has relatively long life. If the sealing element is inadvertently damaged because of misuse or other reason it is easily replaced by unscrewing the operator from the actuator, removing the damaged sealing element and replacing it with a new sealing element, and screwing the operator to the actuator.

It will be observed that switches already in the field without this type of seal can readily be equipped with a seal constructed according to the invention without modification of the switch since the seal does not appreciably change the forces required to actuate the switch or to return the switch to its original position. An environmental seal constructed according to the invention prevents contaminants, such as dust, water and excessive humidity from contaminating the device on which the seal is used.

What is claimed is:

1. A device of the kind described comprising a body member, an actuating member pivotally mounted on the body member and having one end movable laterally relative thereto, one of the members having a relatively smooth surface, and a sealing element mounted on the other of said and fixed thereto and having a rolled band urged into engagement with the smooth surface to provide an environmental seal between the members.

2. A device as described in claim 1 in which the sealing element has a flexible portion under stress for urging the rolled band into engagement with the smooth surface.

3. A device of the kind described in claim 1 which is an electric switch and the actuating member is pivotally mounted on the body member and the rolled band of the sealing element slides over the smooth surface as the actuating member is moved.

4. A device as described in claim 1 in which the rolled band is made of silicone rubber.

5. A device as described in claim 1 which includes a thin layer of silicon grease between the rolled band of the sealing element and the smooth surface.

6. A device of the kind described in claim 1 in which the body member is provided with the smooth surface and the sealing element is mounted on the actuating member and moves therewith.

7. A device as described in claim 6 in which the sealing element is in the form of a disc having a hublike portion fitting snugly around the actuating member and the rolled band is positioned at the circumference of the disc.

8. A device as described in claim 7 in which the sealing element includes a flexible portion between the hublike portion and the rolled band.

9. A device as described in claim 8 in which the flexible portion of the sealing element is under stress for urging the rolled band lightly into engagement with the smooth surface.

10. A device of the kind described in claim 1 in which the actuating member is provided with the smooth surface and the sealing element is mounted on the body member.

11. A device of the kind described in claim 10 in which the sealing element is in the form of a disc having a hublike portion secured to the body member and arranged to accommodate movement of the actuating member and the rolled band is positioned at the circumference of the disc.

12. A device as described in claim 11 in which the sealing element has a flexible portion between the hublike portion and the rolled band.

13. A device as described in claim 12 in which the flexible portion is under stress for urging the rolled band into engagement with the smooth surface.

* * * * *